United States Patent
Han et al.

(10) Patent No.: US 9,419,281 B2
(45) Date of Patent: Aug. 16, 2016

(54) CARBON NEGATIVE ELECTRODE MATERIAL FOR LITHIUM SECONDARY BATTERY, PRODUCTION METHOD THEREOF AND LITHIUM SECONDARY BATTERY USING THE SAME

(75) Inventors: Kyung-Hee Han, Seongnam-si (KR);
Jeong-Hun Oh, Anyang-si (KR);
Jong-Sung Kim, Seoul (KR); Chul Youm, Gyeonggi-do (KR); Jung-Min Han, Seoul (KR); Masataka Takeuchi, Kawasaki (JP); Akinori Sudoh, Omachi (JP); Chiaki Sotowa, Omachi (JP)

(73) Assignee: SHOWA DENKO K.K., Tokyo (JP)

( * ) Notice: Subject to any disclaimer, the term of this patent is extended or adjusted under 35 U.S.C. 154(b) by 1141 days.

(21) Appl. No.: 12/989,616

(22) PCT Filed: Apr. 16, 2009
(Under 37 CFR 1.47)

(86) PCT No.: PCT/KR2009/001966
§ 371 (c)(1),
(2), (4) Date: Aug. 13, 2012

(87) PCT Pub. No.: WO2009/131332
PCT Pub. Date: Oct. 29, 2009

(65) Prior Publication Data
US 2013/0034775 A1    Feb. 7, 2013

(30) Foreign Application Priority Data
Apr. 24, 2008 (KR) .................. 10-2008-0038242

(51) Int. Cl.
*H01M 4/583* (2010.01)
*H01M 4/587* (2010.01)
*H01M 4/133* (2010.01)
*H01M 4/36* (2006.01)
*H01M 10/052* (2010.01)

(52) U.S. Cl.
CPC .............. *H01M 4/587* (2013.01); *H01M 4/133* (2013.01); *H01M 4/362* (2013.01); *H01M 10/052* (2013.01); *Y02E 60/122* (2013.01); *Y02P 70/54* (2015.11)

(58) Field of Classification Search
CPC ... H01M 10/052; H01M 4/133; H01M 4/362; H01M 4/587; Y02E 60/122; Y02P 70/54
USPC .................. 429/213, 231.8; 427/113
See application file for complete search history.

(56) References Cited

U.S. PATENT DOCUMENTS 6,440,610 B1 * 8/2002 Sheem et al. ............ 429/231.8
6,998,192 B1 * 2/2006 Yumoto ................ H01M 4/133
                                                252/182.1
2004/0247872 A1 12/2004 Sudo et al.
(Continued)

FOREIGN PATENT DOCUMENTS

JP    2003-168429 A    6/2003
JP    2003-226510 A    8/2003
(Continued)

*Primary Examiner* — Milton I Cano
*Assistant Examiner* — Ling R Zeng
(74) *Attorney, Agent, or Firm* — Sughrue Mion, PLLC

(57) ABSTRACT

A carbon negative electrode material for a lithium secondary battery includes: a core carbon material; and a coated layer covering the core carbon material and comprising a carbon coating material and carbon fiber.

5 Claims, 3 Drawing Sheets

(56) References Cited

U.S. PATENT DOCUMENTS

| | | | |
|---|---|---|---|
| 2005/0136330 A1* | 6/2005 | Mao et al. | 429/231.95 |
| 2006/0134516 A1* | 6/2006 | Im et al. | 429/218.1 |
| 2006/0188784 A1 | 8/2006 | Sudoh et al. | |
| 2007/0218367 A1 | 9/2007 | Yamaguchi et al. | |
| 2009/0202917 A1 | 8/2009 | Sotowa et al. | |
| 2010/0035149 A1* | 2/2010 | Fujiwara | C01B 31/02 429/209 |
| 2010/0086856 A1* | 4/2010 | Matsumoto et al. | 429/231.8 |

FOREIGN PATENT DOCUMENTS

| | | |
|---|---|---|
| JP | 2006-173121 A | 6/2006 |
| KR | 10-2004-0040473 A | 5/2004 |
| KR | 10-2006-0052902 A | 5/2006 |
| KR | 10-2006-0069738 A | 6/2006 |
| KR | 10-2007-0087866 A | 8/2007 |
| WO | 03/028128 A2 | 4/2003 |
| WO | 2005/067081 A1 | 7/2005 |
| WO | 2007072858 A1 | 6/2007 |

\* cited by examiner

- S100 — Mixing natural graphite/pitch/carbon fiber
- S110 — firing
- S120 — Removing fine particle
- S130 — Performing roll mixing milling
- S140 — Manufacturing electrode

CARBON NEGATIVE ELECTRODE MATERIAL FOR LITHIUM SECONDARY BATTERY, PRODUCTION METHOD THEREOF AND LITHIUM SECONDARY BATTERY USING THE SAME

TECHNICAL FIELD

The present invention relates to a carbon negative electrode material (or an anode active material) for a lithium secondary battery and, more particularly, to a carbon negative electrode material for a lithium secondary battery capable of preventing damage to an electrode and improving conductivity by containing carbon fiber, a manufacturing method thereof, and a lithium secondary battery using the same.

BACKGROUND ART

Recently, as the use of electronic devices, such as a mobile phone, a portable notebook computer, an electric vehicle, and the like, using a battery, is rapidly spreading, demand for a lithium secondary battery which is small and light yet has a relatively high capacity is increasing, and this trend continues to accelerate.

Natural graphite, commonly used as a core carbon material of a negative active material (or an anode active material) for a lithium secondary battery, has an excellent initial discharge capacity but has a problem in that as a charging and discharging cycle is repeated, the charging and discharging efficiency and charging and discharging capacity thereof are drastically degraded. Such a problem results from electrolyte decomposition generated from an edge portion of the highly crystalline natural graphite.

Thus, in an effort to overcome this problem, a technique of coating natural graphite with pitch is commonly used. In addition, in manufacturing an electrode plate of a battery after a negative active material is formed by coating natural graphic with pitch, a method of adding a conductive material such as Ketjen Black, Super P, or the like to slurry in use for manufacturing the electrode plate is also used in order to improve electrical conductivity.

Meanwhile, recently, a technique of improving conductivity by adding a conductive additive such as carbon fibers to a negative electrode for a lithium secondary battery using natural graphite has been introduced. In relation to this, PCT/JP 2004-019835 discloses a technique in which, after a carbonaceous negative active material is completely manufactured, a binder such as styrene-butadiene rubber (SBR) and carbon fibers having a diameter of 1 nm to 1000 nm are mixed and subjected to roll mixing milling, the end product of which is then coated on a metal current collection plate to thus constitute a negative electrode for a lithium secondary battery.

However, this related art has a problem in that carbon fibers are not evenly distributed within the negative active material for a lithium secondary battery and are re-agglomerated so as to degrade the electrochemical characteristics thereof. In addition, it appears that the use of SBR as an electrode binder makes it difficult for the hydrophobic carbon fibers to be sufficiently distributed within the negative active material.

DISCLOSURE

Technical Problem

An aspect of the present invention provides a carbon negative electrode material for a lithium secondary battery capable of preventing damage to an electrode and improving electrochemical characteristics by disposing carbon fiber in a carbon negative material to ensure a sufficiently uniform distribution, a manufacturing method thereof, and a lithium secondary battery using the same.

Technical Solution

According to an aspect of the present invention, there is provided a carbon negative electrode material for a lithium secondary battery, including: a core carbon material; and a coated layer covering (or wrapping) the core carbon material and including a carbon coating material and carbon fiber.

The core carbon material may be natural graphite, and the carbon coating material may be pitch.

The core carbon material may have a crystallite size of 90 nm or greater in a c-axis direction in its crystal system.

90% or more of the entirety of the particles of the core carbon material may have a diameter ranging from 5 μm to 50 μm.

The core carbon material may have a BET specific surface area of 0.5 $m^2$/g to 30 $m^2$/g.

In the carbon fiber, each of fiber filaments may have an aspect ratio of 10 to 15000, the carbon fiber may be a vapor-grown carbon fiber graphitized through a heat treatment at 2000° C. or higher. Each of the fiber filaments of the vapor-grown carbon fiber may include a hollow extending along its central axis and include a branched carbon fiber filament. An average inter-layer (inter-face) interval in a (002) crystal face measured by an X-ray diffraction method in the vapor-grown carbon fiber may be 0.344 nm or smaller.

The carbon fiber may contain 0.1 ppm to 100000 ppm of boron.

The pitch used as the carbon coating material may be petroleum pitch which is processed to have an average particle diameter of 1 μm to 20 μm through pulverization, and may have the following characteristics.

1) Content of V.M (Volatile matter): 20 wt % to 60 wt %, content of F.C. (Fixed Carbon): 40 wt % to 80 wt %, KS method [KS E 2197-96]

2) Softening point: 80° C. to 300° C., metra method ([ASTM-D3104-77]

3) Content of QI (Quinoline Insoluble): 0.01 wt % to 6.0 wt %, [ASTM-D2318-98]

4) Content of TI (Toluene Insoluble): 20 wt % to 70 wt %, [ASTM-D4027-98]

A molar ratio of an aromatic compound to an aliphatic compound contained in the pitch used as the carbon coating material may be 0.5 or larger.

The ratio of the number of carbon elements to the entire number of elements included in the pitch may be 60% or greater.

The content of QI to the entire weight of the pitch may be 5 wt % or lower.

The pitch may have a softening point of 100° C. or higher.

The amount of carbon coating material may range from 0.01 wt % to 20 wt % on the basis of the total amount of the core carbon material, the carbon coating material, and the carbon fiber.

The amount of carbon fiber may range from 0.05 wt % to 15 wt % on the basis of the total amount of the core carbon material, the carbon coating material, and the carbon fiber. Preferably, the amount of carbon fiber ranges from 0.05 wt % to 5 wt %.

The carbon coating material and the carbon fiber may form a low crystalline surface on the core carbon material.

According to another aspect of the present invention, there is provided a method for preparing a carbon negative electrode material for a lithium secondary battery, including: (a) weighing and preparing a high crystalline core carbon material, a low crystalline carbon coating material to be coated on the surface of the core carbon material, and carbon fiber; (b) simultaneously mixing the carbon coating material and carbon fiber in the prepared high crystalline core carbon material; and (c) firing (or baking) the mixture and sorting (or classifying) the resultant material to remove fine particles.

Natural graphite may be used as the core carbon material, and pitch may be used as the carbon coating material.

The amount of carbon coating material may range from 0.01 wt % to 20 wt % on the basis of the total amount of the core carbon material, the carbon coating material, and the carbon fiber.

The amount of carbon fiber may be weighed to range from 0.05 wt % to 15 wt % on the basis of the total amount of the core carbon material, the carbon coating material, and the carbon fiber.

The firing temperature may be 900° C. or higher.

According to another aspect of the present invention, there is provided a lithium secondary battery including: a carbon negative electrode material including a core carbon material, and a carbon coating material and carbon fiber which are simultaneously coated on the core carbon material.

DESCRIPTION OF DRAWINGS

The above and other aspects, features and other advantages of the present invention will be more clearly understood from the following detailed description taken in conjunction with the accompanying drawings, in which.

BEST MODE

Figure 1:
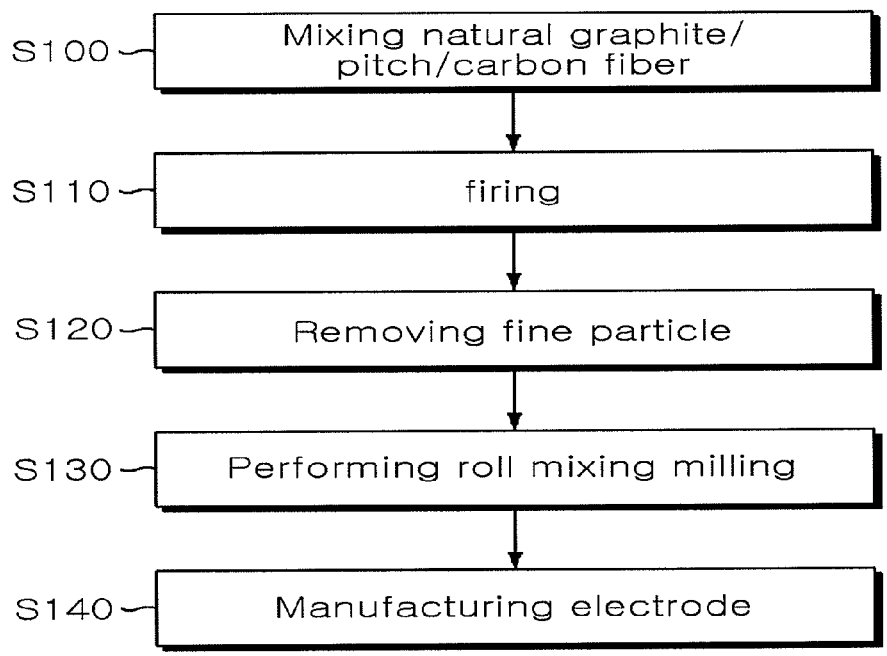
FIG. 1 is a flow chart illustrating the process of a method for preparing a carbon negative electrode material for a lithium secondary battery according to an exemplary embodiment of the present invention.
Figure 2:
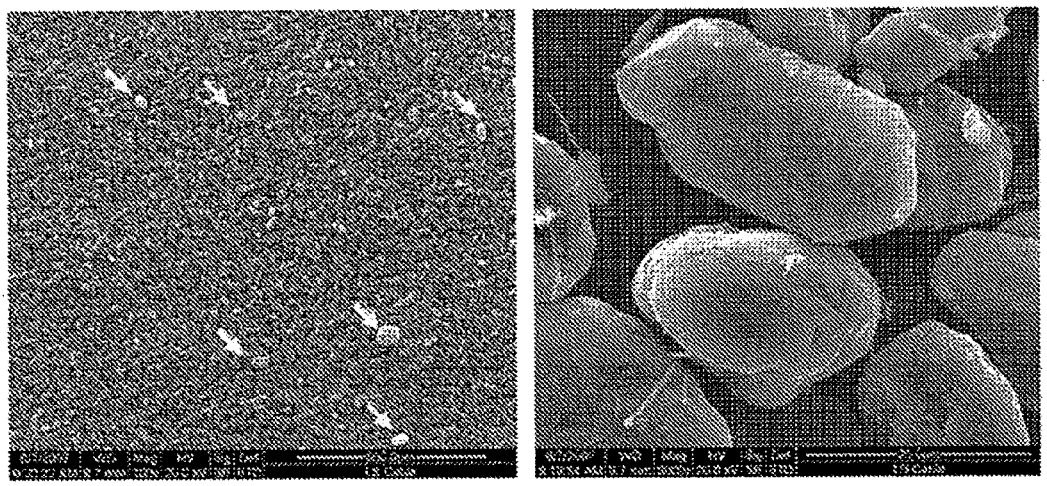
FIGS. 2 to 5 are scanning electron microscope (SEM) photographs showing a degree of distribution of carbon fiber within a mixture of natural graphite, pitch, and carbon fiber provided according to exemplary embodiments of the present invention.
Figure 3:
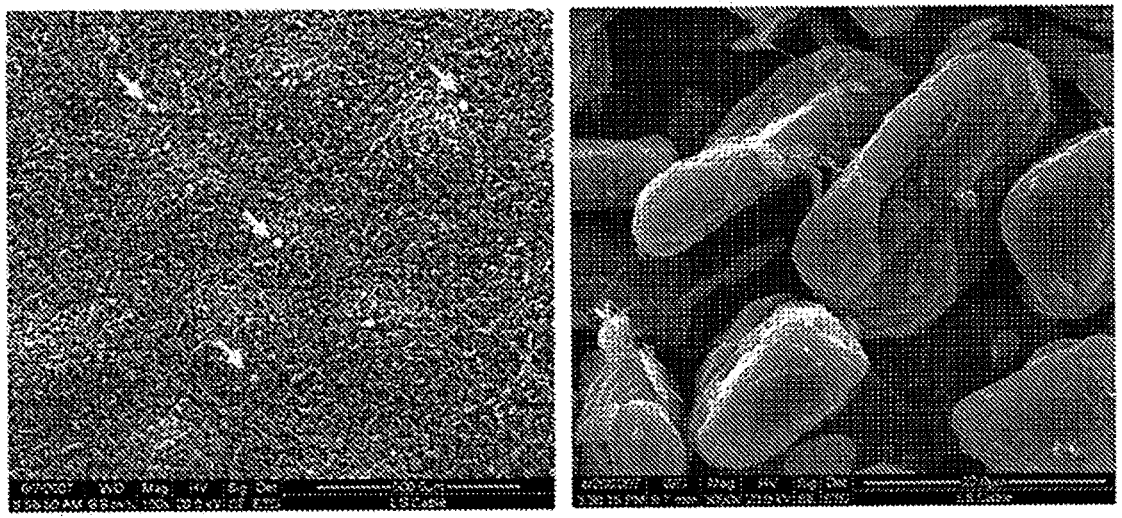
Figure 4:
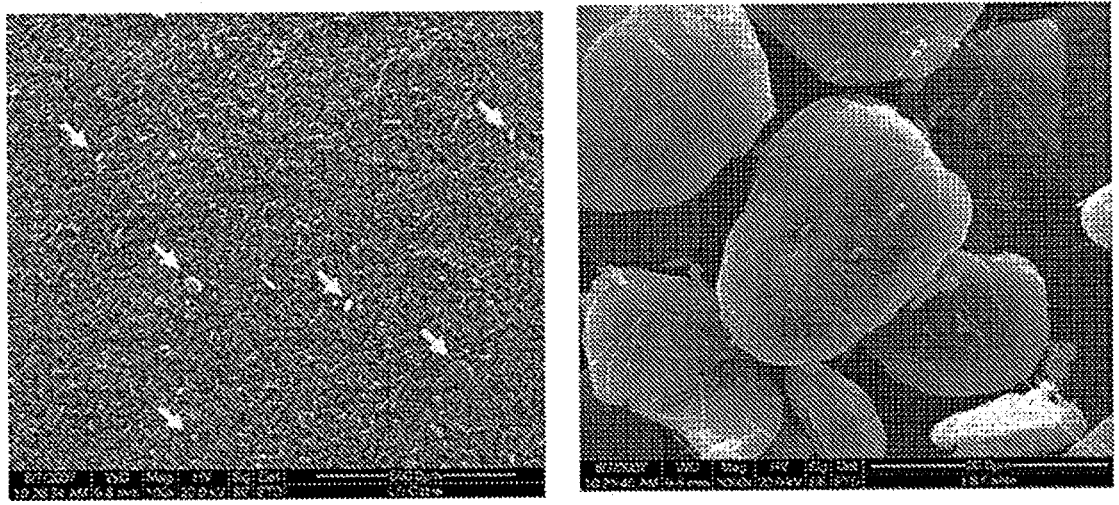
Figure 5:
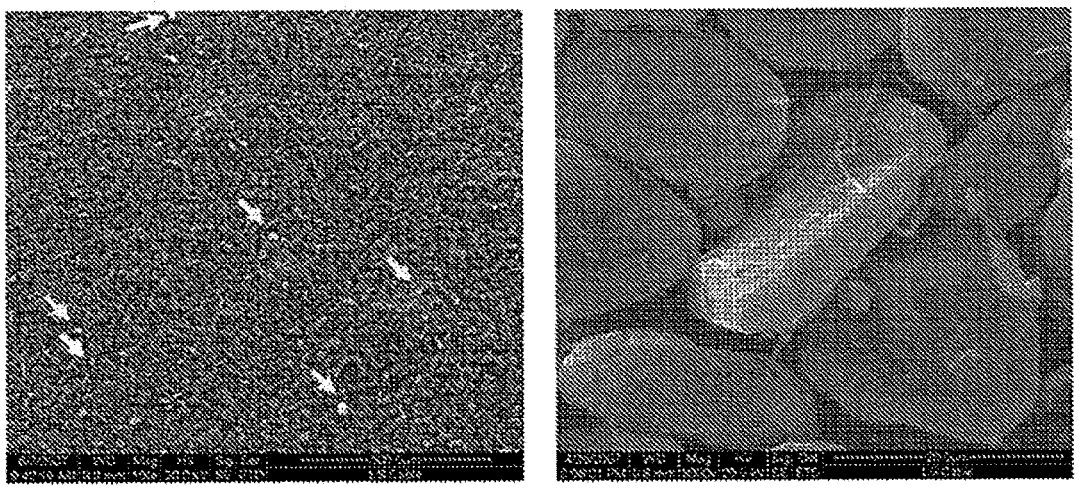

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a flow chart illustrating the process of a method for preparing a carbon negative electrode material for a lithium secondary battery according to an exemplary embodiment of the present invention.

With reference to FIG. 1, a method for preparing a carbon negative electrode material according to an exemplary embodiment of the present invention includes a raw material mixing process (step S100), a mixture firing process (step S110), and a fine particle removing process (step S120).

In the raw material mixing process (step S100), a high crystalline core carbon material, a low crystalline carbon coating material to be coated on the surface of the core carbon material, and carbon fiber are weighed to be prepared, and the carbon coating material and the carbon fiber are simultaneously mixed with the high crystalline core carbon material.

Natural graphite may be used as the high crystalline core carbon material, and pitch may be used as the low crystalline carbon coating material. Also, in order to provide high conductivity with a small amount of carbon fibers, preferably, a vapor-grown carbon fiber having a large aspect ratio is employed.

Preferably, in the graphite used as the core carbon material, a crystallite size in a c-axis direction in a crystal system of the graphite is 90 nm or greater, and as for a particular grain size (or granularity) measured by a laser diffraction method, 90% or more of the entirety of the particles are distributed to have a diameter ranging from 5 μm to 50 μm, and preferably, a BET (Brunauer, Emmett & Teller) specific surface area of the core carbon material measured by general BET equipment ranges from 0.5 m²/g to 30 m²/g.

An aspect ratio of each of fiber filaments of the vapor-grown carbon fiber is 10 to 15000, and the vapor-grown carbon fiber may be carbon fiber graphitized through a heat treatment at 2000° C. or higher. Preferably, the graphite carbon fiber contains 0.1 ppm to 100000 ppm of boron.

Each of the fiber filaments of the vapor-grown carbon fiber includes a hollow extending along its central axis and includes a branched carbon fiber filament. An average interlayer (or interface) distance at the (002) crystal face measured by an X-ray diffraction method of the vapor-grown carbon fiber is 0.344 nm or less.

Pitch used as carbon coating material is petroleum pitch which is processed to have an average particle diameter of 1 μm to 20 μm through pulverization, and has the following characteristics.

1) Content of V.M (Volatile matter): 20 wt % to 60 wt %, content of F.C. (Fixed Carbon): 40 wt % to 80 wt %, KS method [KS E 2197-96]

2) Softening point: 80° C. to 300° C., metra method ([ASTM-D3104-77]

3) Content of QI (Quinoline Insoluble): 0.01 wt % to 6.0 wt %, [ASTM-D2318-98]

4) Content of TI (Toluene Insoluble): 20 wt % to 70 wt %, [ASTM-D4027-98]

Preferably, a molar ratio of an aromatic compound to an aliphatic compound contained in the pitch is 0.5 or larger. Preferably, the carbon content denoted by the ratio of the number of carbon elements to the entire number of elements included in the pitch is 60% or greater. Preferably, content of QI to the entire weight of the pitch is 5 wt % or lower. Preferably, a softening point of the pitch is 100° C. or higher.

In order to maximize the effect provided according to an exemplary embodiment of the present invention, the amount of the pitch may range from 0.01 wt % to 20 wt % and the amount of carbon fiber may range from 0.05 wt % to 15 wt % on the basis of the total amount of the core carbon material, the carbon coating material, and the carbon fiber. Preferably, the amount of carbon fiber is determined to range from 0.05 wt % to 5 wt %.

When the raw material mixing process (step S100) is completed, a coated layer including the pitch and the carbon fiber is formed on the natural graphite, obtaining a mixture having a low crystalline surface.

Thereafter, the mixture is fired and sorted to remove fine particles, thus finally obtaining a carbon negative electrode material for a lithium secondary battery (step S110 and step S120). In this case, preferably, the firing process is performed at a temperature of 900° C. or higher in consideration of the composition of the mixture containing the carbon fiber.

The carbon negative electrode material for a lithium secondary battery manufactured thusly is mixed along with an electrode binder such as aqueous styrene-butadiene rubber (SBR) dispersions, and is then coated on copper foil, dried, and shaped to manufacture a carbon electrode for a lithium secondary battery (step S130 and step S140).

MODE FOR INVENTION

Hereinafter, a detailed method of manufacturing the carbon negative electrode material for a lithium secondary battery and electrochemical characteristics of a battery employing a carbon negative electrode material manufactured according to the method will now be described.

Embodiment 1

Spherical natural graphite, a certain weight ratio of pitch, and a certain amount of a carbon fiber (VGCF of Showa Denko K.K., Japan) were input into a nauta mixer including a casing having an inversely conical shape and a screw that rotates and makes a revolution according to a multi-dimensional movement scheme, and were mixed for one hour. A small amount of the mixture was extracted to observe the distribution of the carbon fiber with a scanning electron microscope (SEM). The residual mixture was fired at 1100° C., which was then sorted to remove fine particles, thus manufacturing a negative active material. 100 g of the carbon negative electrode material manufactured thusly was put into a 500 ml reactor, and an aqueous carboxymethyl cellulose (CMC) solution and aqueous styrene-butadiene rubber (SBR) dispersions were introduced into the reactor, which were then mixed by using a mixer and coated with a thickness of about 100 μm on copper foil. Thereafter, the resultant material was dried and shaped through roll compression. The density per volume of the manufactured electrode was adjusted to be 1.6 g/cm$^3$. In order to evaluate the manufactured electrode, a coin cell was manufactured and its charging and discharging efficiency and cycle characteristics were assessed.

Embodiment 2

Spherical natural graphite, a certain weight ratio of pitch, and a certain amount of a carbon fiber were input into a nauta mixer and mixed for one hour and then mixed for 10 minutes at a high speed of 25 m/s by using a mixing machine including a stirrer blade mounted at a lower portion of a cylindrical container thereof. Except for this, other processes are the same as those of Embodiment 1.

Embodiment 3

Spherical natural graphite, a certain weight ratio of pitch, and a certain amount of a carbon fiber were mixed for 10 minutes at a high speed of 25 m/s by using a mixing machine including a stirrer blade mounted at a lower portion of a cylindrical container thereof. Except for this, other processes are the same as those of Embodiment 1.

Embodiment 4

Spherical natural graphite, a certain weight ratio of pitch, and a certain amount of a carbon fiber were mixed for 20 minutes at a high speed of 25 m/s by using a mixing machine including a stirrer blade mounted in a lower portion of a cylindrical container thereof. Except for this, other processes were the same as those of Embodiment 1.

Comparative Example 1

Spherical natural graphite and a certain weight ratio of pitch were mixed for 10 minutes at a high speed of 25 m/s by using a mixing machine including a stirrer blade mounted in a lower portion of a cylindrical container thereof. The mixture was fired at 1100° C. and sorted to remove fine particles, thus manufacturing a negative active material. The carbon negative material manufactured thusly and a certain amount of carbon fiber were simultaneously put into a 500 ml reactor without dry blending, and an aqueous carboxymethyl cellulose (CMC) solution and aqueous styrene-butadiene rubber (SBR) dispersions were introduced into the reactor, which were then mixed by using a mixer and coated with a thickness of about 100 μm on copper foil.

Thereafter, the resultant material was dried and shaped through roll compression. The density per volume of the manufactured electrode was adjusted to be 1.6 g/cm$^3$. In order to evaluate the manufactured electrode, a coin cell was manufactured and its charging and discharging efficiency and cycle characteristics were assessed.

Comparative Example 2

Spherical natural graphite and a certain weight ratio of pitch were mixed for 10 minutes at a high speed of 25 m/s by using a mixing machine including a stirrer blade mounted in a lower portion of a cylindrical container thereof. The mixture was fired at 1100° C. and sorted to remove fine particles, thus manufacturing a negative active material. The carbon negative material manufactured thusly and a certain amount of carbon fiber were mixed in a dry manner for 30 minutes at 200 rpm by using a stirrer mixer, and a small amount of the mixture was extracted to observe the distribution of carbon fiber with SEM. 100 g of the residual mixture was put into a 500 ml reactor, and an aqueous carboxymethyl cellulose (CMC) solution and aqueous styrene-butadiene rubber (SBR) dispersions were introduced into the reactor, which were then mixed by using a mixer and coated with a thickness of about 100 μm on copper foil.

Thereafter, the resultant material was dried and shaped through roll compression. The density per volume of the manufactured electrode was adjusted to be 1.6 g/cm$^3$. In order to evaluate the manufactured electrode, a coin cell was manufactured and its charging and discharging efficiency and cycle characteristics were assessed.

Comparative Example 3

Spherical natural graphite and a certain weight ratio of pitch were mixed for 10 minutes at a high speed of 25 m/s by using a mixing machine including a stirrer blade mounted in a lower portion of a cylindrical container thereof. The mixture was fired at 1100° C. and sorted to remove fine particles, thus manufacturing a negative active material. 100 g of the carbon negative material manufactured thusly, without a carbon fiber, were put into a 500 ml reactor, and an aqueous carboxymethyl cellulose (CMC) solution and aqueous styrene-butadiene rubber (SBR) dispersions were introduced into the reactor, which were then mixed by using a mixer and coated with a thickness of about 100 (m on copper foil.

Thereafter, the resultant material was dried and shaped through roll compression. The density per volume of the manufactured electrode was adjusted to be 1.6 g/cm3. In order to evaluate the manufactured electrode, a coin cell was manufactured and its charging and discharging efficiency and cycle characteristics were assessed.

Evaluation of the Distribution Characteristics of Carbon Fiber

A distribution degree of the carbon fiber was checked by capturing an image of the mixtures prepared according to Embodiments 1 to 4 and Comparative Example 2 by using a SEM (Hitachi Ltd., Japan) at magnifications of 1000 and 3000.

Figure 6:
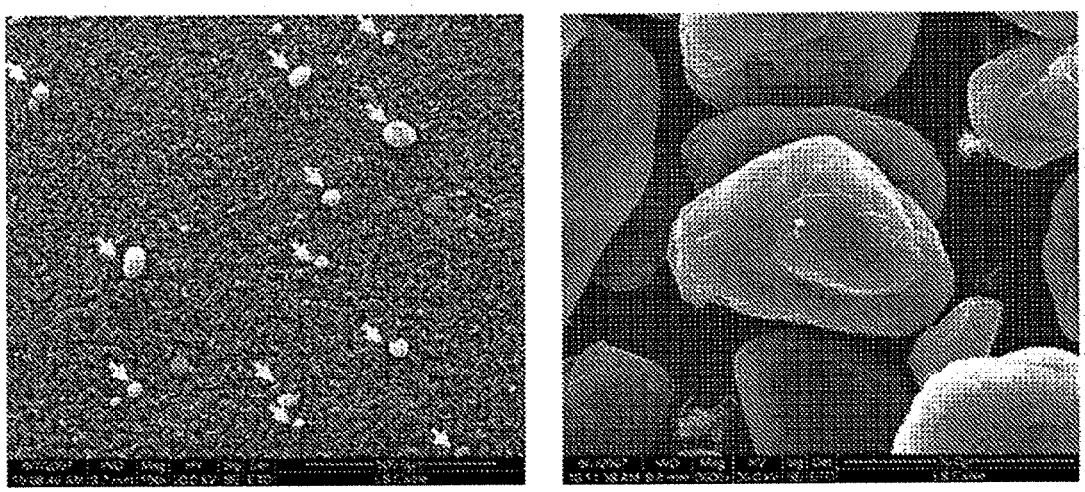
FIG. 6 is a SEM photograph showing a degree of distribution of carbon fiber within a mixture of a carbon negative electrode material and carbon fiber prepared according to a comparative example of the present invention.

With reference to FIGS. 2 to 5 (Embodiments 1 to 4) and FIG. 6 (Comparative Example 2), it is noted that, unlike the Comparative Example 2, the carbon negative electrode materials according to the Embodiments 1 to 4 of the present invention have the characteristics that carbon fibers are less agglomerated (see portions indicated by arrows) and sufficiently evenly distributed.

Evaluation of Battery Characteristics

Charging and discharging tests were performed on the coin cells manufactured according to the Embodiments 1 to 4 and the Comparative Examples 1 to 3. In the coin cell testing, an electrolyte in which LiPF6 (1 mol/L) was dissolved was used as an electrolyte for a mixture of ethylene carbonate (EC) (3 mass parts) and diethyl carbonate (DEC) (7 mass parts).

The potential was regulated to range from 0 V to 1.5 V. A charge current of 0.5 mA/cm2 was charged until it reached 0.01V, and also, charging was maintained at 0.01V until the charge current reached 0.02 mA/cm2. In discharge testing, current was discharged with 0.5 mA/cm2 until it reached 1.5V. Table 1 below shows the results obtained by checking cycle characteristics by repeating the foregoing processes. In Table 1, the charging and discharging efficiency (see cycle efficiency) shows the ratio of discharged electric capacity to charged electric capacity in the first process.

TABLE 1

| Classification | 1st cycle discharge capacity (mAh/g) | 1st Cycle efficiency (%) | Cycle retention (%) 1st/25th cycle |
|---|---|---|---|
| Embodiment 1 | 356.2 | 94.3 | 98.9 |
| Embodiment 2 | 355.5 | 94.2 | 97.0 |
| Embodiment 3 | 357.7 | 93.9 | 97.9 |
| Embodiment 4 | 354.4 | 94.1 | 98.3 |
| Comparative Example 1 | 351.2 | 91.9 | 87.6 |
| Comparative Example 2 | 352.1 | 93.0 | 94.4 |

With reference to Table 1, it is noted that the coin cells according to the Embodiments of the present invention have higher levels of charging and discharging efficiency than those of the coin cells according to the Comparative Examples, exhibiting superior charging and discharging characteristics and excellent cycle characteristics (see cycle retention). The lithium secondary battery according to an exemplary embodiment of the present invention is assessed to be desirable when it has a discharge capacity of 340 mAh/g or larger and a charging and discharging efficiency of 90% or higher.

As described above, the carbon negative electrode material having the structure in which the carbon coating material and the carbon fiber are simultaneously coated on the core carbon material is provided. The carbon fibers according to an exemplary embodiment of the present invention, which are hardly dispersed or distributed, have distinctive features in that they can be sufficiently uniformly or evenly distributed within the negative active material and have the effect of improving charging and discharging efficiency and cycle characteristics.

As set forth above, according to exemplary embodiments of the invention, carbon fibers can be evenly distributed within a negative active material, and an conduction path of an electrode and an electrolyte permeation path can be prevented from being damaged in a pressing process for manufacturing (or producing) an electrode, thus improving conductivity of the electrode.

INDUSTRIAL APPLICABILITY

While the present invention has been shown and described in connection with the exemplary embodiments, it will be apparent to those skilled in the art that modifications and variations can be made without departing from the spirit and scope of the invention as defined by the appended claims.

The invention claimed is:

1. A method for manufacturing a carbon negative electrode material for a lithium secondary battery, the method comprising:
    (a) weighing and preparing a high crystalline core carbon material, a carbon coating material to be coated on the surface of the core carbon material, and carbon fiber;
    (b) simultaneously mixing the carbon coating material and carbon fiber in the prepared high crystalline core carbon material; and
    (c) firing the mixture and sorting the resultant material to remove fine particles,
    wherein the carbon coating material is petroleum pitch which is processed to have an average particle diameter of 1 µm to 20 µm through pulverization, and has the following characteristics:
    1) content of volatile matter: 20 wt % to 60 wt %, content of fixed carbon: 40 wt % to 80 wt %, measured by KS method according to KS E 2197-96;
    2) softening point: 80° C. to 300° C., measured by metra method according to ASTM-D3104-77;
    3) content of quinoline insoluble: 0.01 wt % to 6.0 wt %, according to ASTM-D 2318-98, and
    4) content of toluene insoluble: 20 wt % to 70 wt %, according to ASTM-D 4027-98.

2. The method of claim 1, wherein natural graphite is used as the core carbon material.

3. The method of claim 1, wherein, in the operation (a), the amount of carbon coating material is weighed to range from 0.01 wt % to 20 wt % on the basis of the total amount of the core carbon material, the carbon coating material, and the carbon fiber.

4. The method of claim 1, wherein, in the operation (c), the amount of carbon fiber is weighed to range from 0.05 wt % to 15 wt % on the basis of the total amount of the core carbon material, the carbon coating material, and the carbon fiber.

5. The method of claim 1, wherein, in the operation (c), the firing process is performed at 900° C. or higher.

* * * * *